(12) United States Patent
Morisaki

(10) Patent No.: US 8,725,337 B2
(45) Date of Patent: May 13, 2014

(54) ELECTRIC POWERED VEHICLE AND CONTROL METHOD THEREOF

(75) Inventor: Keisuke Morisaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/879,969

(22) PCT Filed: Feb. 3, 2011

(86) PCT No.: PCT/JP2011/052245
§ 371 (c)(1),
(2), (4) Date: Apr. 17, 2013

(87) PCT Pub. No.: WO2012/105022
PCT Pub. Date: Aug. 9, 2012

(65) Prior Publication Data
US 2013/0218390 A1    Aug. 22, 2013

(51) Int. Cl.
*B60L 15/20* (2006.01)
*B60W 20/00* (2006.01)

(52) U.S. Cl.
USPC ... 701/22; 180/65.1; 180/65.275; 180/65.285

(58) Field of Classification Search
USPC .................. 701/22; 180/65.1, 65.275, 65.285
See application file for complete search history.

(56) References Cited

U.S. PATENT DOCUMENTS

| 2010/0097018 | A1 | 4/2010 | Itoh et al. |
| 2010/0116575 | A1* | 5/2010 | Nozawa et al. .......... 180/65.285 |
| 2010/0305796 | A1 | 12/2010 | Aoki et al. |
| 2011/0006598 | A1 | 1/2011 | Yamakawa et al. |

FOREIGN PATENT DOCUMENTS

| JP | 61 147710 | 7/1986 |
| JP | 5 95109 | 12/1993 |
| JP | 6 276603 | 9/1994 |
| JP | 7 222310 | 8/1995 |
| JP | 2008 295224 | 12/2008 |
| JP | 2009 131079 | 6/2009 |
| JP | 2009 225614 | 10/2009 |
| JP | 2010 98876 | 4/2010 |
| JP | 2010 119158 | 5/2010 |

OTHER PUBLICATIONS

International Search Report Issued Apr. 26, 2011 in PCT/JP11/52245 Filed Feb. 3, 2011.

* cited by examiner

*Primary Examiner* — Mary Cheung
*Assistant Examiner* — Brian P Sweeney
(74) *Attorney, Agent, or Firm* — Oblon, Spivak, McClelland, Maier & Neustadt, L.L.P.

(57) ABSTRACT

When a determination is made that the shift range is other than the R range, an ECU sets the system voltage for forward running. When a determination is made that the shift range is in the R range, the ECU sets the system voltage for backward running. The system voltage for backward running is set to become higher than the system voltage applied for forward running for an identical level of acceleration requirement for the vehicle.

11 Claims, 6 Drawing Sheets

ELECTRIC POWERED VEHICLE AND CONTROL METHOD THEREOF

TECHNICAL FIELD

The present invention relates to an electric powered vehicle and a method of controlling the electric powered vehicle, particularly an electric powered vehicle including a boost converter between a power storage device and a drive device driving an electric motor, and a method of controlling the electric powered vehicle.

BACKGROUND ART

As environment-friendly vehicles, electric powered vehicles such as a hybrid vehicle and electric vehicle are drawing attention. These electric powered vehicles incorporate, as the power source for vehicle running, a power storage device, an inverter, and a motor driven by the inverter. The hybrid vehicle further includes an engine as the power source.

Among such electric powered vehicles, there is known a vehicle including a boost converter, located between a power storage device and an inverter driving a motor, for boosting the voltage supplied to the inverter (hereinafter, also referred to as "system voltage") to a level equal to or higher than the voltage of the power storage device.

Japanese Patent Laying-Open No. 2009-131079 (PTL 1) discloses an electric powered vehicle including such a boost converter. The vehicle is provided with an eco-mode switch for the user to designate fuel-efficient running. When the eco-mode switch is turned on, the upper limit value of the system voltage is lowered from the normal upper limit value to a restricted upper limit value. Accordingly, the system voltage is restricted to allow fuel-efficient running (refer to PTL 1).

CITATION LIST

Patent Literature

PTL 1: Japanese Patent Laying-Open No. 2009-131079
PTL 2: Japanese Patent Laying-Open No. 2010-119158
PTL 3: Japanese Patent Laying-Open No. 2010-98876
PTL 4: Japanese Patent Laying-Open No. 2009-225614

SUMMARY OF INVENTION

Technical Problem

The technique disclosed in the aforementioned Japanese Patent Laying-Open No. 2009-131079 is useful in that the mileage can be improved by restricting the system voltage. However, there is a possibility that the driving force desired by the driver cannot be obtained during backward running where deliberate accelerator manipulation is required such as running over an stepped area when moving backward into the garage or the like.

In view of the foregoing, an object of the present invention is to improve the driveability in backward running while attempting to increase the mileage at an electric powered vehicle.

Solution to Problem

According to the present invention, an electric powered vehicle includes an electric motor generating a vehicle driving force, a power storage device, a drive device driving the electric motor, a voltage conversion device, and a control device controlling the voltage conversion device. The voltage conversion device is provided between the drive device and the power storage device, and is configured to boost an input voltage (system voltage) of the drive device higher than the voltage of the power storage device. The control device sets, in backward running, the system voltage to be higher than the system voltage applied in forward running for an identical level of acceleration requirement for the vehicle (accelerator pedal position, required driving force, required output, and the like).

Preferably, the control device sets, in forward running, an upper limit of the system voltage so as to restrict the system voltage, and modifies, in backward running, the upper limit setting of the system voltage, as compared to the setting applied in forward running, so as to alleviate restriction on the system voltage applied in forward running.

Preferably, the control device sets, in backward running, the upper limit of the system voltage higher than the upper limit applied in forward running.

Preferably, the control device sets, in backward running, the system voltage that is set according to an acceleration requirement by the driver higher than the system voltage applied in forward running.

Preferably, the electric powered vehicle further includes an input device for the driver to select any of a normal mode and a saving mode. When the saving mode is selected by the input device, the control device sets, in forward running, the upper limit of the system voltage so as to restrict the system voltage, as compared to the normal mode, and modifies, in backward running, the upper limit setting of the system voltage, as compared to the setting applied in forward running, so as to alleviate restriction on the system voltage applied in forward running.

Preferably, the electric powered vehicle further includes an internal combustion engine generating a forward driving force.

According to the present invention, a control method is directed to a method of controlling an electric powered vehicle. The electric powered vehicle includes an electric motor generating a vehicle driving force, a power storage device, a drive device driving the electric motor, and a voltage conversion device. The voltage conversion device is provided between the drive device and the power storage device, and is configured to boost an input voltage (system voltage) of the drive device higher than the voltage of the power storage device. The method of controlling includes a first step of setting the system voltage for forward running, and a second step of setting the system voltage for backward running.

Preferably, the first step includes the step of setting an upper limit of the system voltage for forward running. The second step includes the step of setting the upper limit of the system voltage for backward running.

Preferably, the first step includes the step of setting the upper limit of the system voltage for forward running so as to restrict the system voltage. The second step includes the step of setting the upper limit of the system voltage for backward running so as to alleviate restriction on the system voltage applied in forward running.

Preferably, the electric powered vehicle further includes an input device for the driver to select any of a normal mode and a saving mode. The first step includes the step of setting, when the saving mode is selected by the input device, the upper limit of the system voltage for forward running so as to restrict the system voltage, as compared to the normal mode. The second step includes the step of setting, when the saving mode is selected by the input device, the upper limit of the system voltage for backward running so as to alleviate restriction on the system voltage applied in forward running.

Preferably, the electric powered vehicle further includes an internal combustion engine generating a forward driving force.

Advantageous Effects of Invention

According to the present invention, when in backward driving, the input voltage of the driving device (system voltage) is set to become higher than the system voltage applied in forward running for an identical level of acceleration requirement for the vehicle. Therefore, the system voltage is set appropriately in consideration of the mileage and driveability for every forward running and backward running. Thus, according to the present invention, the driveability in backward running can be improved while attempting to increase the mileage at an electric powered vehicle.

DESCRIPTION OF EMBODIMENTS

Figure 1:
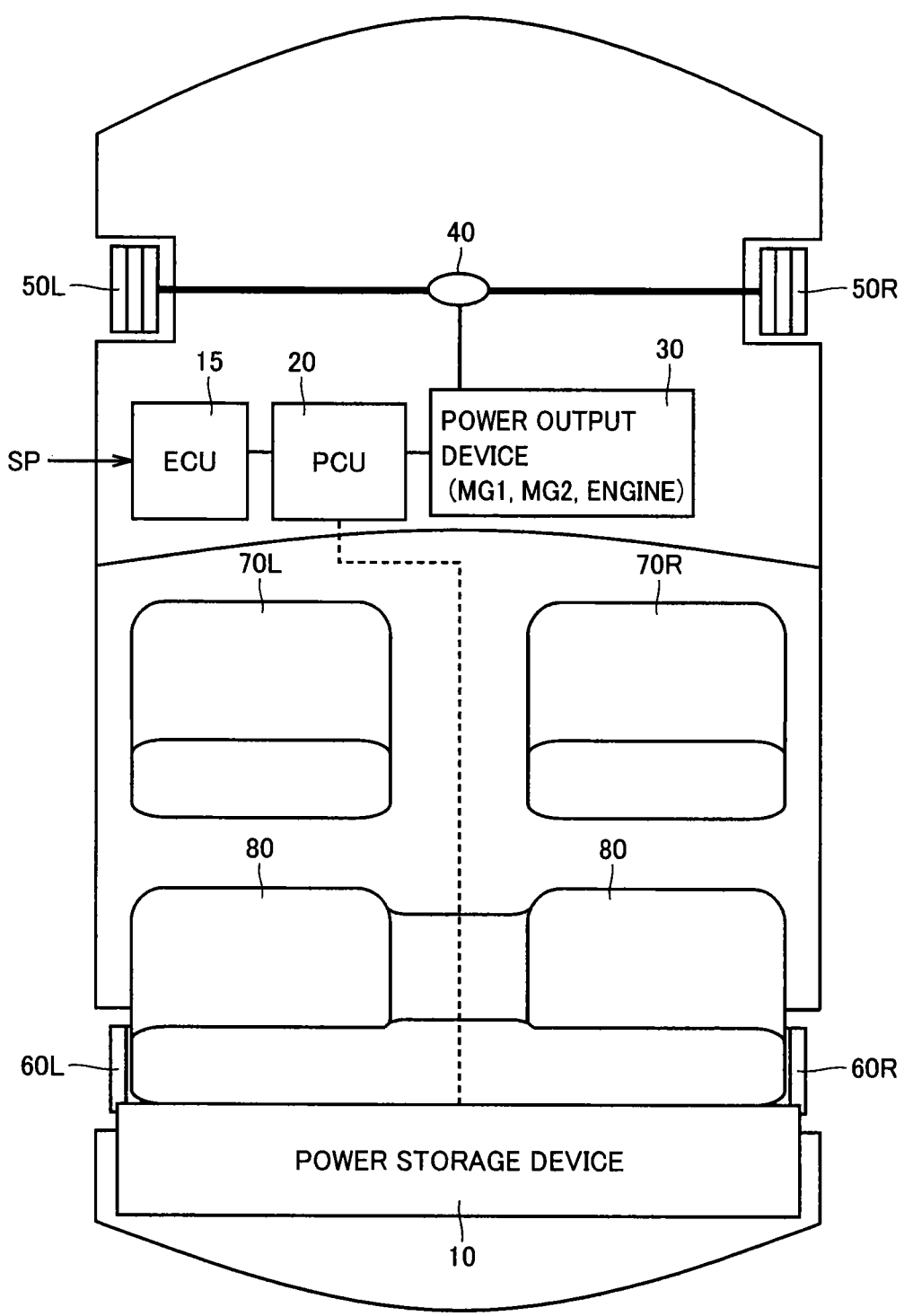
FIG. 1 is a block diagram representing an entire configuration of a hybrid vehicle provided as an example of an electric powered vehicle according to a first embodiment.

Embodiments of the present invention will be described in detail hereinafter with reference to the drawings. In the drawings, the same or corresponding elements have the same reference character denoted, and description thereof will not be repeated.

First Embodiment

FIG. 1 is a block diagram representing an entire configuration of a hybrid vehicle provided as an example of an electric powered vehicle according to a first embodiment. Referring to FIG. 1, a hybrid vehicle 100 includes a power storage device 10, an ECU (Electronic Control Unit) 15, a PCU (Power Control Unit) 20, a power output device 30, a transmission gear 40, front wheels 50L and 50R, and rear wheels 60L and 60R.

Power storage device 10 is a rechargeable DC power source, formed of a secondary battery such as of nickel-metal hydride, lithium ions, and the like. Power storage device 10 is arranged at the rear section of a rear seat 80, for example, and is electrically connected with PCU 20 to supply DC voltage thereto. Power storage device 10 is charged by receiving electric power generated by power output device 30 from PCU 20.

PCU 20 generically represents a power converter required in hybrid vehicle 100. PCU 20 includes a converter boosting the voltage supplied from power storage device 10, an inverter driving a motor generator in power output device 30, and the like.

ECU 15 receives a signal from various sensors (not shown) indicating the driving status and vehicle status. The signal from various sensors includes a shift position signal SP indicating the position of the shift lever, an accelerator pedal position signal corresponding to the stepped amount on the accelerator pedal, a vehicle speed signal indicating the vehicle speed, and the like. ECU 15 executes various control related to hybrid vehicle 100 based on the signal from various sensors.

Power output device 30 is provided as a driving force source of the wheel, and includes motor generators MG1 and MG2, and an engine. These components are mechanically coupled via a power split device (not shown). Distribution and coupling of the driving force are carried out among the aforementioned three components via the power split device according to the running status of hybrid vehicle 100. As a result, front wheels 50L and 50R are driven. A transmission gear 40 transmits the power output from power output device 30 to front wheels 50L and 50R, and transmits the rotating force from front wheels 50L and 50R to power output device 30. Accordingly, power output device 30 transmits the power from the engine and motor generator to front wheels 50L and 50R via transmission gear 40 to drive front wheels 50L and 50R. Further, power output device 30 receives the rotating force of the motor generator through front wheels 50L and 50R to generate power for output to PCU 20.

PCU 20 responds to a control designation from ECU 15 to boost DC voltage received from power storage device 10 and converts the boosted DC voltage into AC voltage to drive motor generators MG1 and MG2 in power output device 30. During regenerative operation of motor generators MG1 and MG2, PCU 20 responds to a control designation from ECU 15 to convert the AC voltage generated at motor generators MG1 and MG2 into DC voltage to charge power storage device 10.

Figure 2:
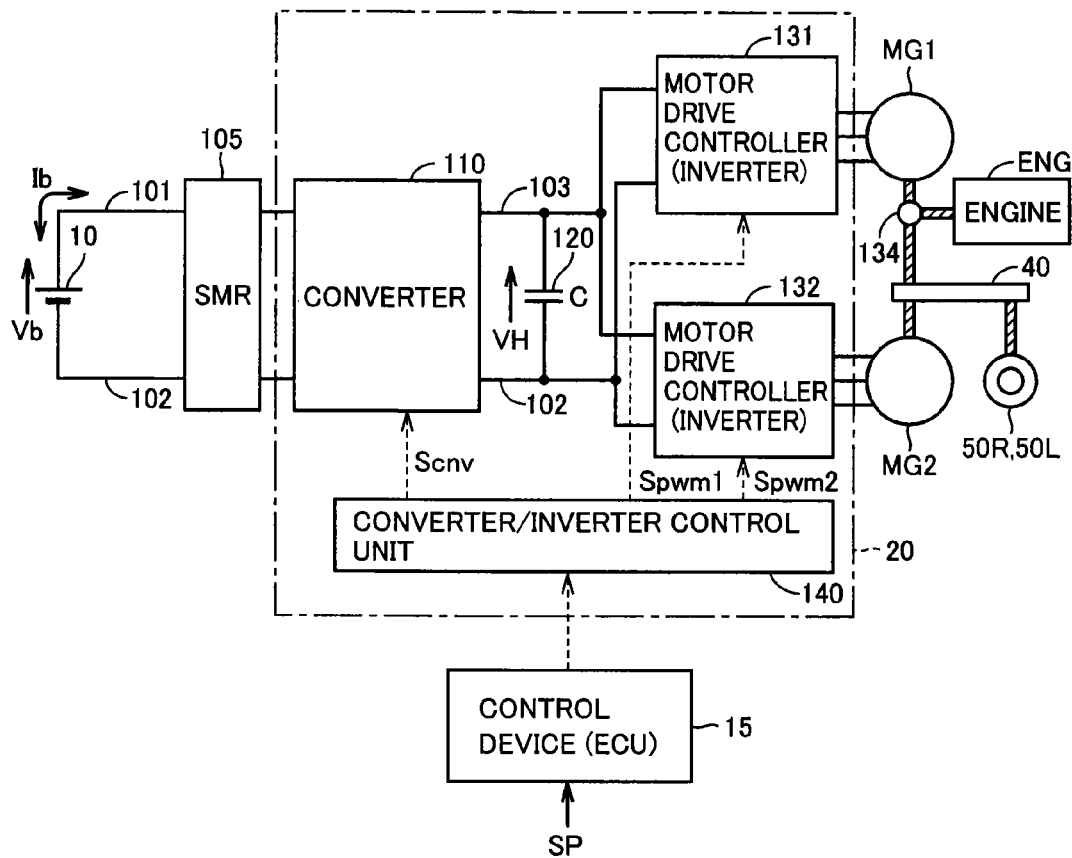
FIG. 2 is a block diagram of a powertrain configuration of a hybrid vehicle.

FIG. 2 is a block diagram representing a powertrain configuration of hybrid vehicle 100. Referring to FIG. 2, hybrid vehicle 100 includes power storage device 10, SMR (System Main Relay) 105, PCU 20, ECU 15, motor generators MG1 and MG2, an engine ENG, power split device 134, transmission gear 40, and front wheels 50R and 50L.

Power split device 134 is coupled with engine ENG, motor generator MG1, and transmission gear 40 to distribute the power among these components. For example, a planetary gear including three rotational shafts of a sun gear, a planetary carrier, and a ring gear can be used as power split device 134. These three rotational shafts are connected to each rotational shaft of motor generator MG1, engine ENG, and transmission gear 40, respectively. The rotational shaft of motor generator MG2 is coupled to the rotational shaft of transmission gear 40. In other words, motor generator MG2 and transmission gear 40 have the same rotational shaft, which is connected to the ring gear of power split device 134.

The kinetic energy generated by engine ENG is distributed to motor generator MG1 and transmission gear 40 by power split device 134. Engine ENG operates as a power source to drive the vehicle frontward and to drive motor generator MG1. Although motor generators MG1 and MG2 may function as a power generator and also as an electric motor, motor generator MG1 mainly operates as a power generator, and motor generator MG2 mainly operates as an electric motor. In detail, motor generator MG1 receives a portion of the output from engine ENG distributed by power split device 134 to generate power. Motor generator MG1 receives supply of electric power from power storage device 10 to operate as an electric motor, and cranks up engine ENG to start.

Motor generator MG2 is driven by at least one of the electric power stored by power storage device 10 and the electric power generated by motor generator MG1. The driving force of motor generator MG2 is transmitted to the drive shaft of front wheels 50R and 50L via transmission gear 40. In a vehicle braking operation, motor generator MG2 is driven by front wheels 50R and 50L to operate as a power generator. At this stage, the electric power generated by motor generator MG2 is charged to power storage device 10 via PCU 20.

SMR 105 is provided between power storage device 10 and PCU 20, and is turned on in response to an instruction from ECU 15 during vehicle running and the like.

PCU 20 includes a converter 110, a capacitor 120, motor drive controllers 131 and 132, and a converter/inverter control unit 140. In the first embodiment, motor generators MG1 and MG2 are AC motors. Motor drive controllers 131 and 132 are constituted of inverters. Hereinafter, motor drive controller 131 (132) is also referred to as "inverter 131 (132)".

Converter 110 responds to a control signal Scnv from converter/inverter control unit 140 to boost a voltage VH (system voltage) between a positive line 103 and a negative line 102 higher than or equal to voltage Vb of power storage device 10. Converter 110 is formed of a current-reversible type boost chopper circuit.

Inverters 131 and 132 are provided corresponding to motor generators MG1 and MG2, respectively. Inverters 131 and 132 are connected to converter 110 parallel with each other, and respond to control signals Spwm1 and Spwm2 from converter/inverter control unit 140 to drive motor generators MG1 and MG2, respectively.

Converter/inverter control unit 140 generates control signals Scnv, Spwm1 and Spwm2 to drive converter 110, motor generator MG1 and motor generator MG2, respectively, based on a control instruction from ECU 15 (the setting of system voltage VH, torque target of motor generators MG1 and MG2, and the like). Converter/inverter control unit 140 outputs the generated control signals Scnv, Spwm1 and Spwm2 to converter 110, inverter 131 and inverter 132, respectively.

ECU 15 is formed of an electronic control unit to carry out various control such as vehicle running control, charging/discharging control of power storage device 10, setting of system voltage VH and the like by software processing through execution of a prestored program with a CPU (Central Processing Unit), and/or by hardware processing through a dedicated electronic circuit. ECU 15 generates a control instruction to drive PCU 20, and provides the generated control instruction to converter/inverter control unit 140 of PCU 20.

Figure 3:
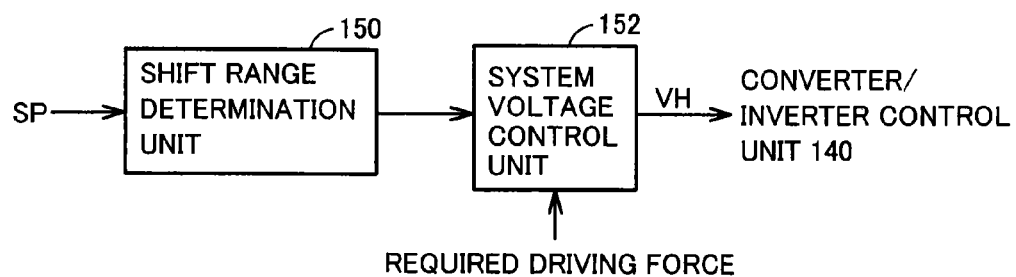
FIG. 3 is a functional block diagram of an ECU related to setting of a system voltage.

FIG. 3 is a functional block diagram of ECU 15 related to the setting of system voltage VH. Referring to FIG. 3, ECU 15 includes a shift range determination unit 150, and a system voltage control unit 152.

Shift range determination unit 150 determines the shift range based on a shift position signal SP indicating the position of the shift lever. The shift range includes, for example, a D range selected in forward running, an R range selected in backward running, an N range selected when not running, and the like.

System voltage control unit 152 sets system voltage VH based on the required driving force of the vehicle. The required driving force is calculated based on the accelerator pedal position, the vehicle speed, and the like. When a determination is made that the shift range is in the R range by shift range determination unit 150, system voltage control unit 152 modifies the setting of system voltage VH, as compared to the setting applied in a shift range other than the R range (such as for the D range). This will be described specifically hereinafter.

By restricting system voltage VH to become less than or equal to a voltage lower than the maximum value (hereinafter, also referred to as "boost restriction"), the power loss at converter 110 and inverters 131 and 132 (FIG. 2) can be suppressed. As a result, the mileage can be improved. In the first embodiment, boost restriction is implemented in order to improve the mileage unless the accelerator pedal is stepped on more than a predetermined amount. However, if the boost restriction is always implemented independent of the driving status, there is a possibility that the vehicle driving force desired by the driver cannot be obtained during backward running where deliberate accelerator manipulation is required such as running over an stepped area when moving backward into the garage or the like. Thus, in the first embodiment, the setting of system voltage VH, when the shift range is in the R range, is modified, as compared to the setting applied when a shift range other than the R range is selected (such as the D range or the like). When in backward running, system voltage VH is set to become higher than system voltage VH applied in forward running for an identical level of acceleration requirement for the vehicle (accelerator pedal position, required driving force, required output, and the like).

System voltage control unit 152 outputs the setting of system voltage VH to converter/inverter control unit 140 (FIG. 2) of PCU 20.

Figure 4:
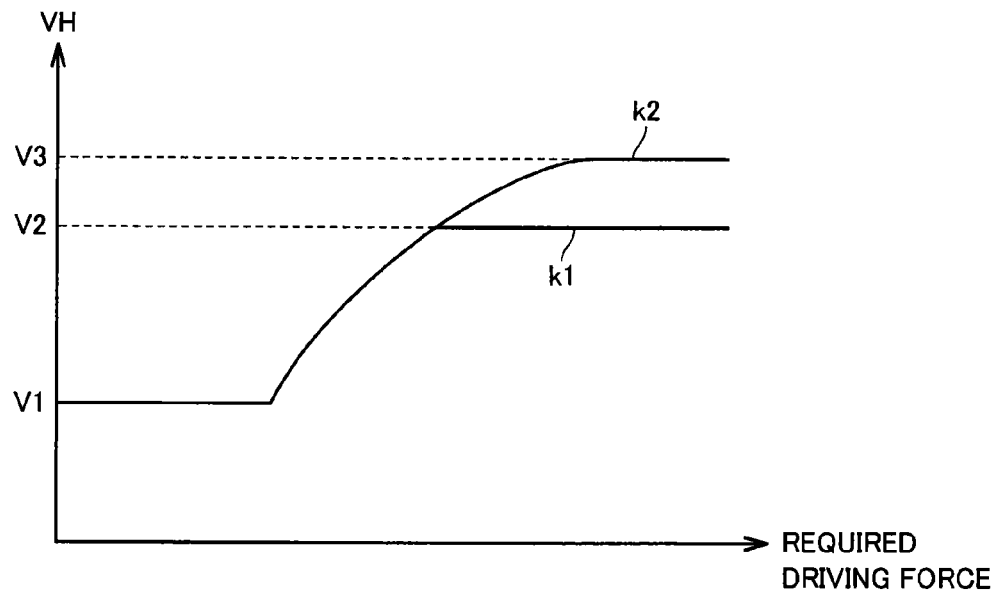
FIG. 4 represents an exemplary setting of the system voltage.

FIG. 4 represents an exemplary setting of system voltage VH. Referring to FIG. 4, the required driving force of the vehicle is plotted along the horizontal axis whereas the set value of system voltage VH is plotted along the vertical axis. Line k1 represents the setting of system voltage VH for forward running that is selected in a shift range other than the R range, whereas line k2 represents the setting of system voltage VH for backward running that is selected in the R range.

When the required driving force is low, system voltage VH is set at a lower limit value V1. When the required driving force exceeds a predetermined value, the setting of system voltage VH becomes higher as the required driving force increases. In forward running (line k1), the upper limit of system voltage VH is set at a restricted value V2, so that system voltage VH is restricted to less than or equal to restricted value V2. In backward running (line k2), the upper limit of system voltage VH is set at an upper limit V3, canceling the boost restriction for forward running.

FIG. 4 corresponds to the case where the setting of the upper limit of system voltage VH is modified between that set for the R range and that set for any other shift range (such as the D range). Alternatively, the system voltage VH itself may be modified between that set for the R range and that set for any other shift range (such as the D range).

Figure 5:
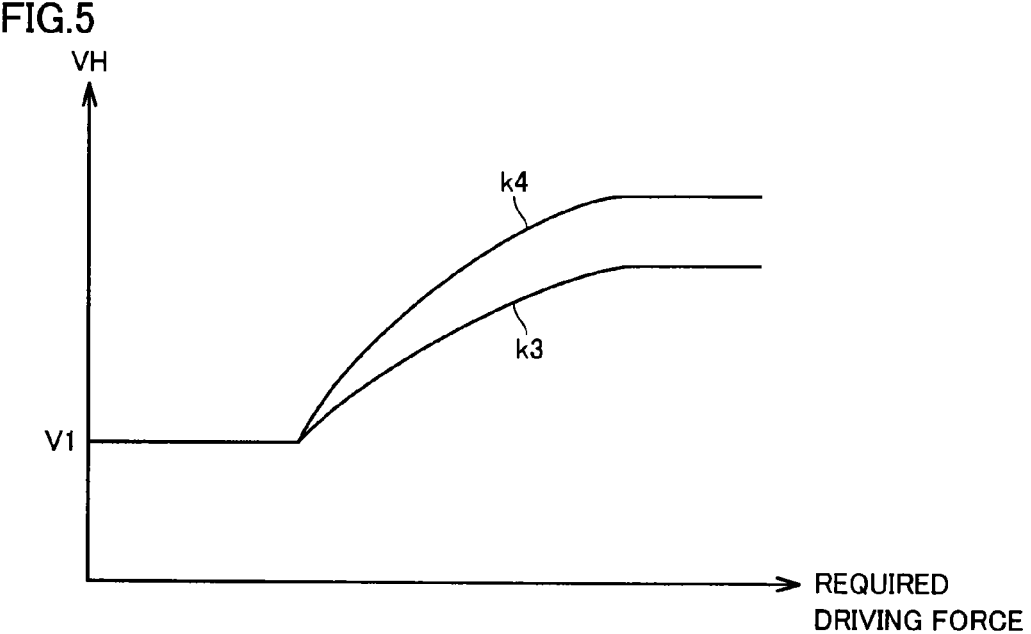
FIG. 5 represents another exemplary setting of the system voltage.

FIG. 5 represents another exemplary setting of system voltage VH. Referring to FIG. 5, line k3 represents the setting of system voltage VH for forward running that is selected in a shift range other than the R range, whereas line k4 represents the setting of system voltage VH for backward running that is selected when in the R range.

The setting of system voltage VH becomes higher in accordance with the increase of the required driving force when the required driving force exceeds a predetermined value. System voltage VH for forward running (line k3) is set to a value lower than system voltage VH applied for backward running where boost restriction is not implemented (line k4), as indicated in the drawing. In other words, system voltage VH is set so as to implement boost restriction, when in forward running, and system voltage VH is set to a value higher than that applied in forward running where boost restriction is implemented, when in backward running where boost restriction is not implemented.

Figure 6:
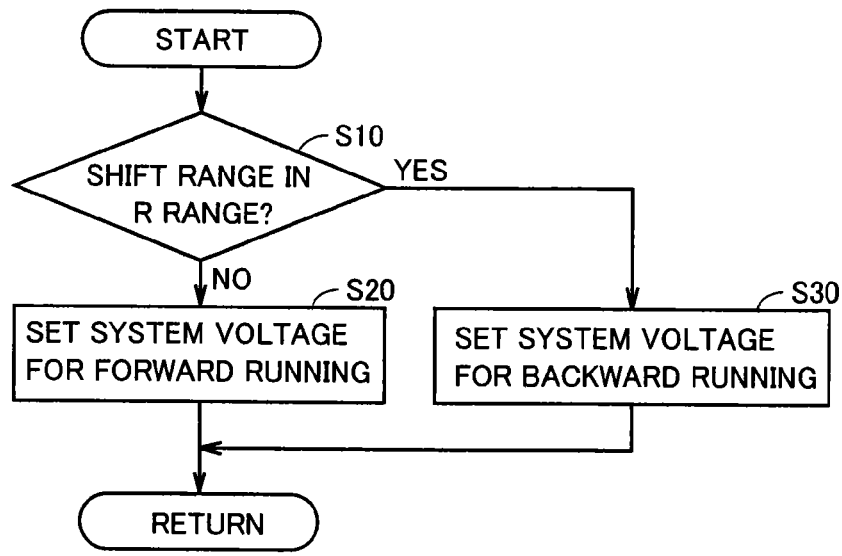
FIG. 6 is a flowchart to describe the procedure related to the setting processing of the system voltage.

FIG. 6 is a flowchart to describe the procedure related to the setting processing of system voltage VH. The processing of this flowchart is invoked from the main routine to be executed at every predetermined time or every time a predetermined condition is satisfied.

Referring to FIG. 6, ECU 15 determines whether the shift range is in the R range or not (step S10). The shift range is determined based on a shift position signal SP indicating the position of the shift lever.

When a determination is made that the shift range is other than the R range (NO at step S10), ECU 15 sets system voltage VH for forward running (step S20). For example, system voltage VH is set based on the vehicle running driving force according to line k1 in FIG. 4 or line k3 in FIG. 5.

When a determination is made that the shift range is in the R range at step S10 (YES at step S10), ECU 15 sets system voltage VH for backward running (step S30). For example, system voltage VH is set based on the vehicle running driving force according to line k2 in FIG. 4 or line k4 in FIG. 5.

Although the above description is based on the case where system voltage VH is set based on the vehicle running driving force, system voltage VH may also be set based on a parameter related to other acceleration requirements for the vehicle such as the accelerator pedal position, the vehicle required power, or the like.

According to the first embodiment, system voltage VH is set, when in backward running, to become higher than the system voltage VH applied in forward running for an identical level of acceleration requirement for the vehicle. Therefore, an appropriate system voltage VH is set taking into consideration the mileage and driveability for every forward running/backward driving. Thus, according to the first embodiment, the driveability in backward running can be improved while attempting to increase the mileage.

[Modification]

Figure 7:
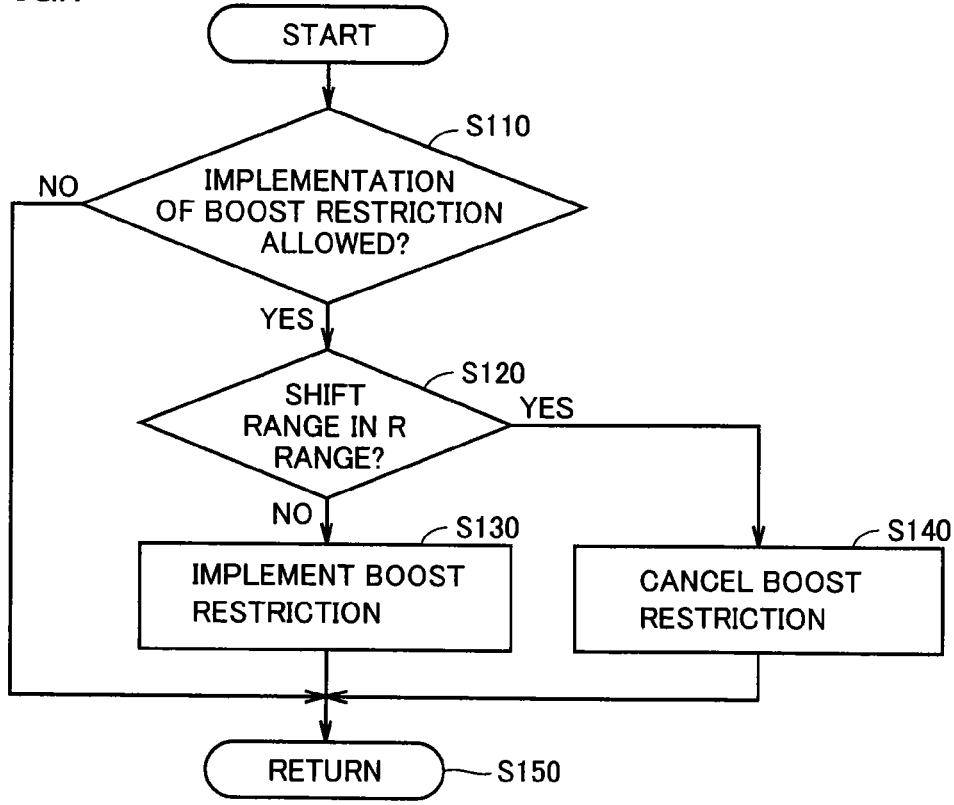
FIG. 7 is a flowchart to describe another procedure related to the setting processing of the system voltage.

FIG. 7 is a flowchart to describe another procedure related to the setting processing of system voltage VH. The processing of the flowchart is invoked from the main routine to be executed at every predetermined time or every time a predetermined condition is satisfied.

Referring to FIG. 7, when a determination is made that boost restriction can be implemented at step S110 (YES at step S110), ECU 15 determines whether the shift range is in the R range or not (step S120).

When a determination is made that the shift range is in a range other than the R range (NO at step S120), ECU 15 implements the boost restriction (step S130). The boost restriction may be realized by lowering the upper limit setting of system voltage VH, as shown in FIG. 4, or by lowering the setting of system voltage VH itself, as shown in FIG. 5.

When a determination is made that the shift range is in the R range at step S120 (YES at step S120), ECU 15 cancels the boost restriction if boost restriction is implemented (step S140). In other words, system voltage VH is set based on the vehicle running driving force according to line k2 in FIG. 4 or line k4 in FIG. 5.

The present modification can provide a functional effect similar to that of the first embodiment.

Second Embodiment

Figure 8:
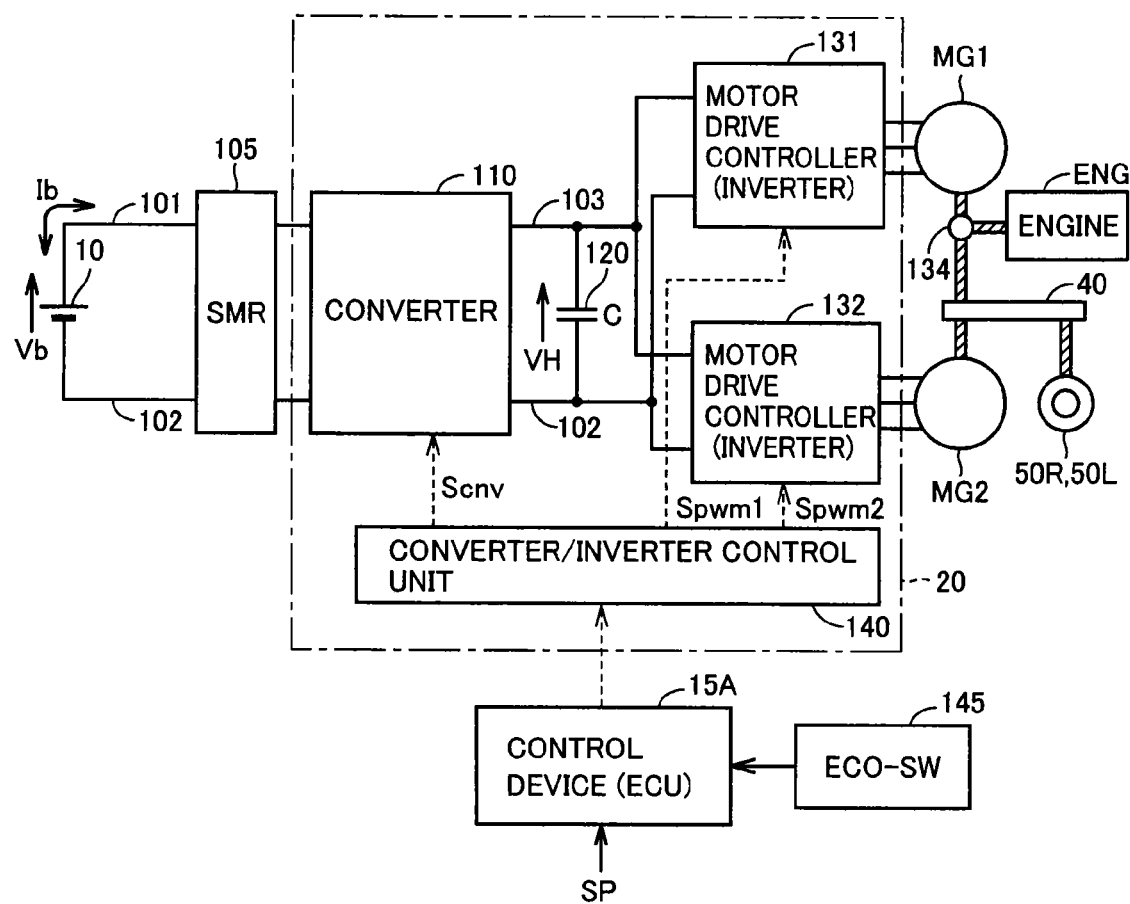
FIG. 8 is a block diagram of a powertrain configuration of a hybrid vehicle according to a second embodiment.

FIG. 8 is a block diagram representing a powertrain configuration of a hybrid vehicle according to a second embodiment. Referring to FIG. 8, the hybrid vehicle further includes an eco-mode switch 145, and an ECU 15A instead of ECU 15, based on the configuration of hybrid vehicle 100 shown in FIG. 2.

Eco-mode switch 145 allows the driver to select either the normal mode or the saving mode. Turning on eco-mode switch 145 causes the saving mode to be selected. When eco-mode switch 145 is turned on, ECU 15A sets, in forward running, the upper limit of system voltage VH so as to restrict system voltage VH, as compared to that applied in the normal mode. In backward running, the upper limit setting of system voltage VH is modified, as compared to the setting applied in forward running, so as to alleviate the aforementioned boost limitation applied in forward running. In other words, the boost restriction implemented in forward running is canceled in backward running.

The remaining function of ECU 15A is similar to that of ECU 15 of the first embodiment. Furthermore, the remaining configuration of the hybrid vehicle is identical to that of hybrid vehicle 100 shown in FIG. 2.

Figure 9:
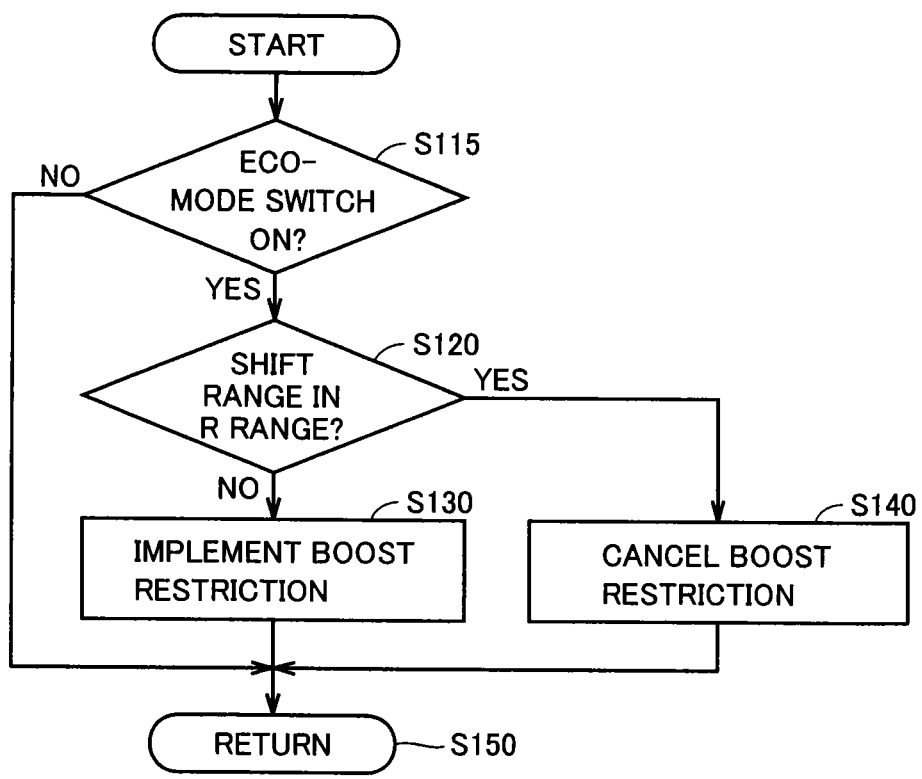
FIG. 9 is a flowchart to describe the procedure related to the setting processing of the system voltage according to the second embodiment.

FIG. 9 is a flowchart to describe the procedure related to the setting processing of system voltage VH in the second embodiment. The processing of the flowchart is invoked from the main routine to be executed at every predetermined time or every time a predetermined condition is satisfied.

Referring to FIG. 9, the flowchart includes step S115, instead of step S110, corresponding to the flowchart of FIG. 7. Namely, ECU 15A determines whether eco-mode switch 145 is turned on or not (step S115).

When a determination is made that eco-mode switch 145 is turned on (YES at step S115), ECU 15A proceeds to the processing of step S120 to determine whether the shift range is in the R range or not. When a determination is made that eco-mode switch 145 is off at step S115 (NO at step S115), ECU 15A proceeds to the processing of step S150.

The second embodiment has an eco-mode switch 145 provided for the user to select fuel-efficient running. Boost restriction is implemented when eco-mode switch 145 is turned on by the driver. The setting of system voltage VH is modified in backward running, as compared to the setting applied in forward running, so as to alleviate the boost restriction. Accordingly, when eco-mode switch 145 is turned on by the driver, an appropriate system voltage VH can be set, taking into consideration fuel-efficient running and the driveability in backward running. Therefore, the driveability in backward running can be improved while attempting to increase the mileage even in the second embodiment.

Although each embodiment set forth above has been described based on a series/parallel type hybrid vehicle that outputs the power of engine ENG to at least one of the drive shaft and motor generator MG1 as the electric powered vehicle, the present invention is also applicable to a hybrid vehicle of another type. For example, the present invention is also applicable to the so-called series type hybrid vehicle that uses engine ENG only for driving motor generator MG1, and that generates the driving force of the vehicle by motor generator MG2 alone.

Moreover, the present invention is also applicable to an electric vehicle that runs with only electric power, absent of an engine ENG, and also to a fuel cell vehicle that further includes a fuel cell in addition to power storage device 10 as the DC power source.

In the above description, motor generator MG2 corresponds to an example of "electric motor" in the present invention. Inverter 132 corresponds to an example of "drive device" in the present invention. Converter 110 corresponds to an example of "voltage conversion device" in the present invention. ECUs 15 and 15A correspond to an example of "control device" in the present invention. Further, eco-mode switch 145 corresponds to an example of "input device" in the present invention. Engine ENG corresponds to an example of "internal combustion engine" in the present invention.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

REFERENCE SIGNS LIST 10 power storage device; 15, 15A ECU; 20 PCU; 30 power output device; 40 transmission gear; 50L, 50R front wheels; 60L, 60R rear wheels; 100 electric powered vehicle; 105 SMR; 110 converter; 120 capacitor; 131, 132 inverter; 134 power split device; 140 converter/inverter control unit; 145 eco-mode switch; 150 shift range determination unit; 152 system voltage control unit; MG1, MG2 motor generator; ENG engine.

The invention claimed is:

1. An electric powered vehicle, comprising:
an electric motor generating a vehicle driving force,
a power storage device,
an inverter driving said electric motor,
a voltage converter provided between said inverter and said power storage device, and configured to boost an input voltage of said inverter higher than a voltage of said power storage device, and
an electronic control unit controlling said voltage converter,
said electronic control unit setting, in backward running, said input voltage to be higher than said input voltage applied in forward running for an identical level of acceleration requirement for the vehicle.

2. The electric powered vehicle according to claim 1, wherein said electronic control unit sets, in forward running, an upper limit of said input voltage so as to restrict said input voltage, and modifies, in backward running, the upper limit setting of said input voltage, as compared to the setting applied in forward running, so as to alleviate restriction on said input voltage applied in forward running.

3. The electric powered vehicle according to claim 1, wherein said electronic control unit sets, in backward running, an upper limit of said input voltage higher than the upper limit applied in forward running.

4. The electric powered vehicle according to claim 1, wherein said electronic control unit sets, in backward running, said input voltage that is set according to an acceleration requirement by a driver higher than said input voltage applied in forward running.

5. The electric powered vehicle according to claim 1, further comprising an input device for a driver to select any of a normal mode and a saving mode,
wherein, when said saving mode is selected by said input device, said electronic control unit sets, in forward running, an upper limit of said input voltage so as to restrict said input voltage, as compared to said normal mode, and modifies, in backward running, the upper limit setting of said input voltage, as compared to the setting applied in forward running, so as to alleviate restriction on said input voltage applied in forward running.

6. The electric powered vehicle according to claim 1, further comprising an internal combustion engine generating a forward driving force.

7. A method of controlling an electric powered vehicle, said electric powered vehicle including
an electric motor generating a vehicle driving force,
a power storage device,
an inverter driving said electric motor, and
a voltage converter provided between said inverter and said power storage device, and configured to boost an input voltage of said inverter higher than a voltage of said power storage device,
said method of controlling comprising:
a first step of setting said input voltage for forward running, and
a second step of setting said input voltage for backward running to be higher than said input voltage set at said first step when a level of acceleration requirement for the vehicle is identical in forward running and in backward running.

8. The method of controlling an electric powered vehicle according to claim 7, wherein
said first step includes the step of setting an upper limit of said input voltage for forward running, and
said second step includes the step of setting the upper limit of said input voltage for backward running, higher than the upper limit of said input voltage for forward running.

9. The method of controlling an electric powered vehicle according to claim 7, wherein
said first step includes the step of setting an upper limit of said input voltage for forward running so as to restrict said input voltage, and
said second step includes the step of setting the upper limit of said input voltage for backward running so as to alleviate restriction on said input voltage applied in forward running.

10. The method of controlling an electric powered vehicle according to claim 7, said electric powered vehicle further including an input device for a driver to select any of a normal mode and a saving mode, wherein
said first step includes the step of setting an upper limit of said input voltage for forward running so as to restrict said input voltage, as compared to said normal mode, when said saving mode is selected by said input device, and
said second step includes the step of setting the upper limit of said input voltage for backward running, so as to alleviate restriction on said input voltage applied in forward running, when said saving mode is selected by said input device.

11. The method of controlling an electric powered vehicle according to claim 7, said electric powered vehicle further including an internal combustion engine generating a forward driving force.

* * * * *